Jan. 21, 1947.  V. BENDIX  2,414,435
HELICOPTER BUS
Filed March 30, 1944  8 Sheets-Sheet 1
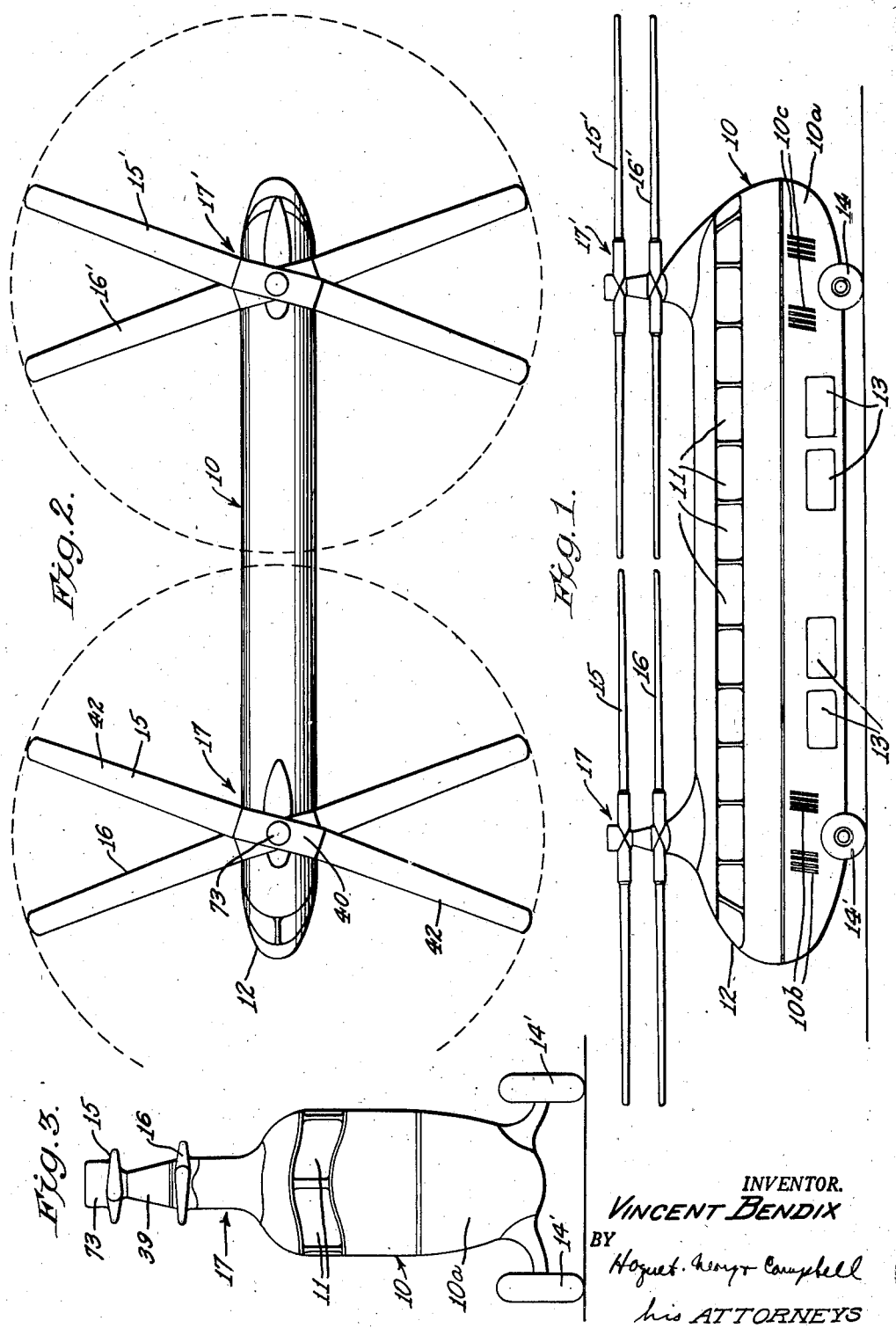
INVENTOR.
VINCENT BENDIX
BY
his ATTORNEYS Jan. 21, 1947.  V. BENDIX  2,414,435
HELICOPTER BUS
Filed March 30, 1944  8 Sheets-Sheet 3

INVENTOR.
VINCENT BENDIX
BY
his ATTORNEYS

Jan. 21, 1947.  V. BENDIX  2,414,435
HELICOPTER BUS
Filed March 30, 1944  8 Sheets-Sheet 4

INVENTOR.
VINCENT BENDIX
BY
his ATTORNEYS

Jan. 21, 1947. V. BENDIX 2,414,435
HELICOPTER BUS
Filed March 30, 1944 8 Sheets-Sheet 5
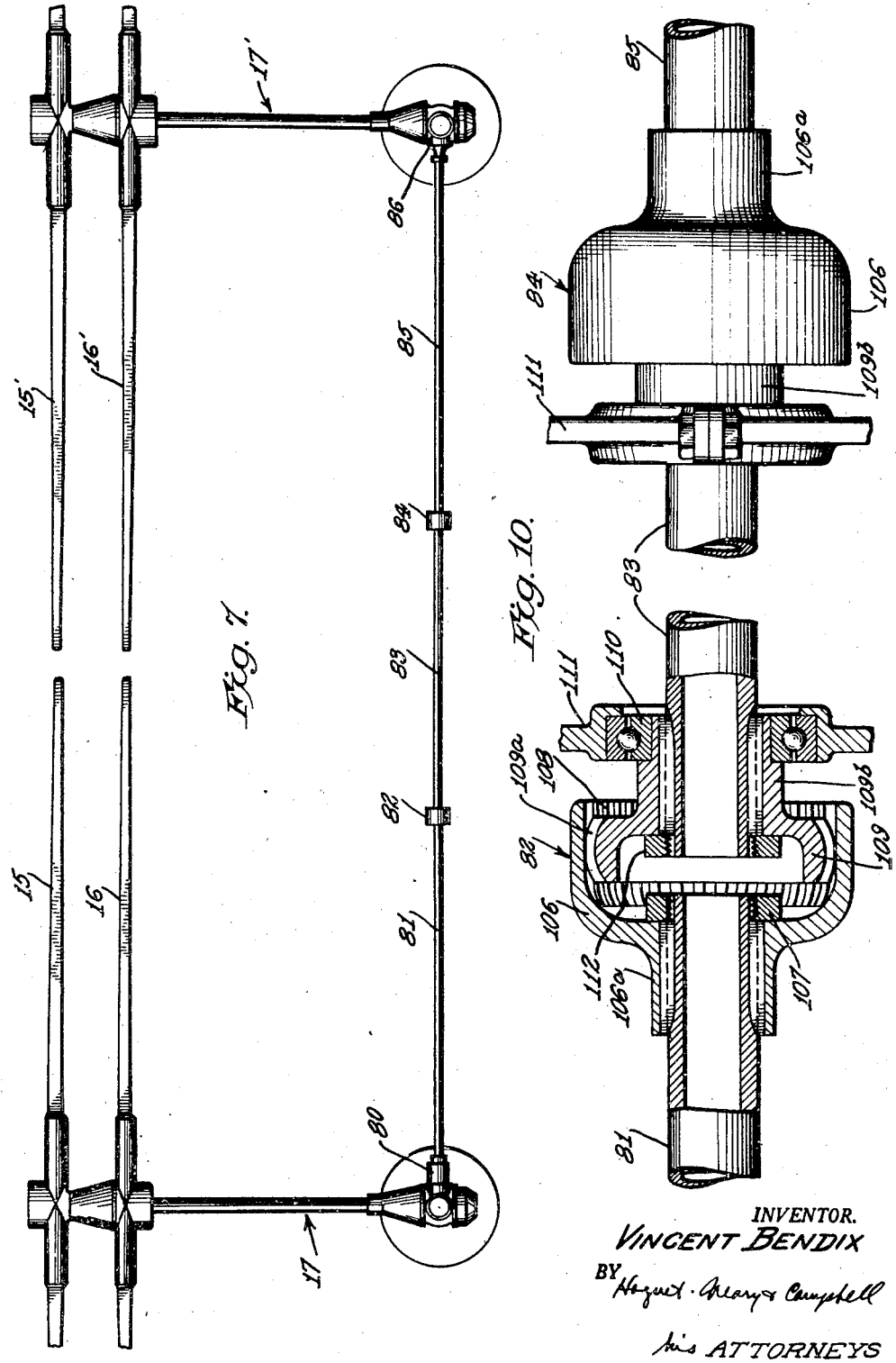
INVENTOR.
VINCENT BENDIX
BY
his ATTORNEYS

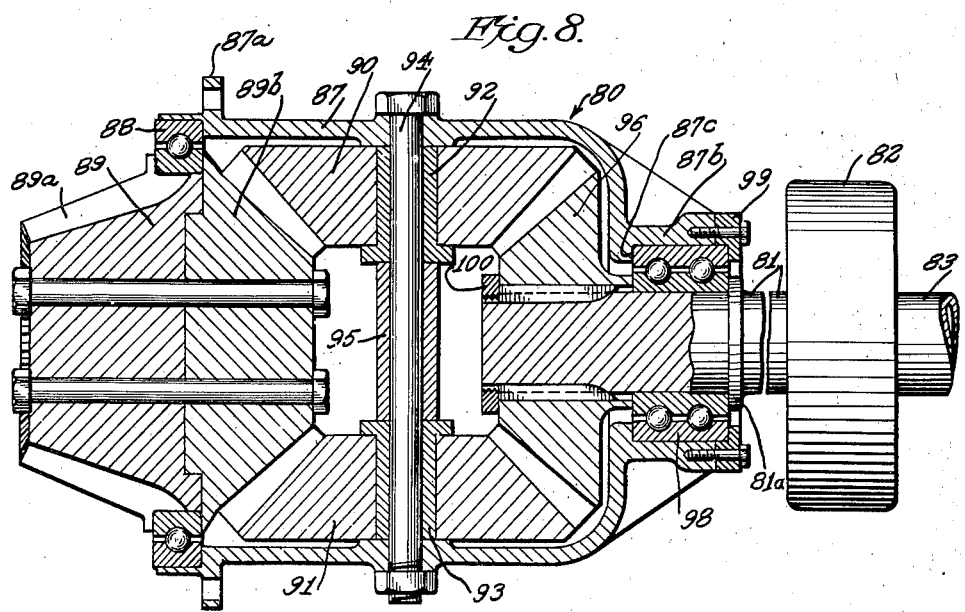
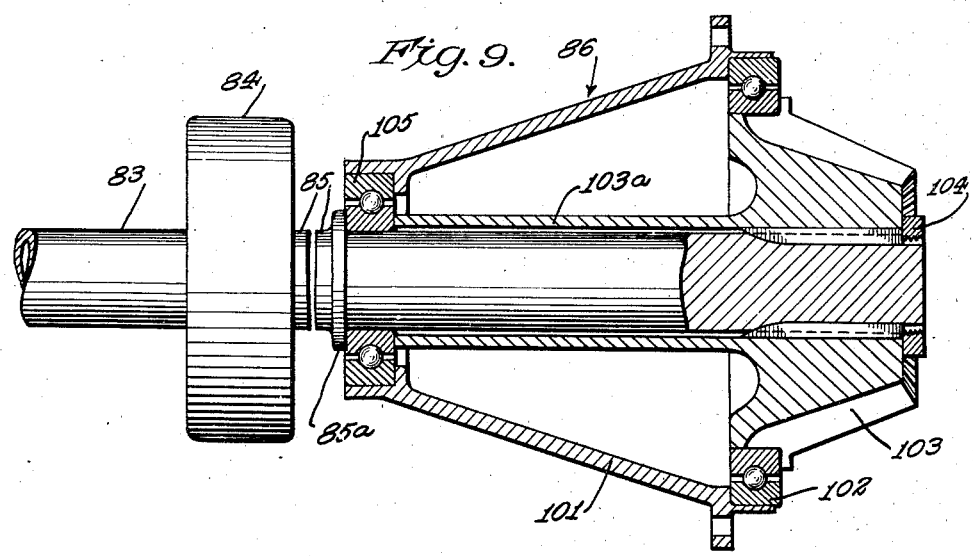

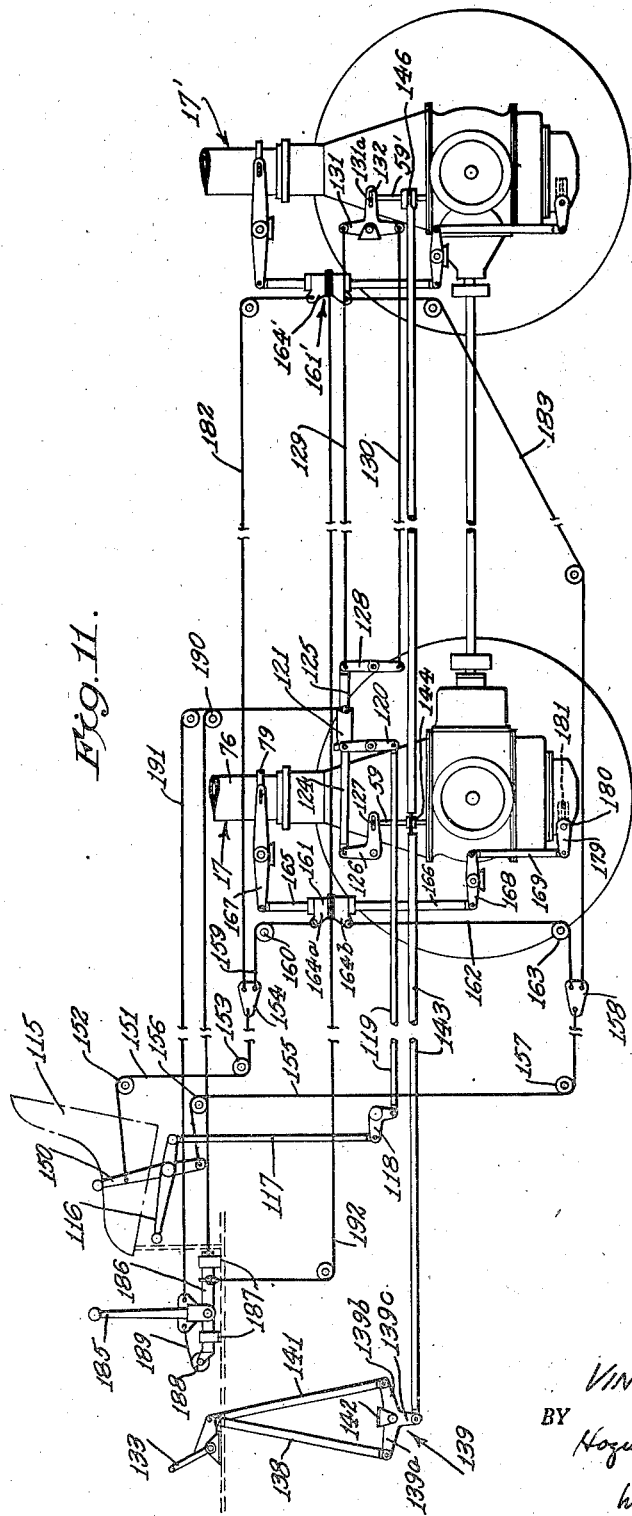

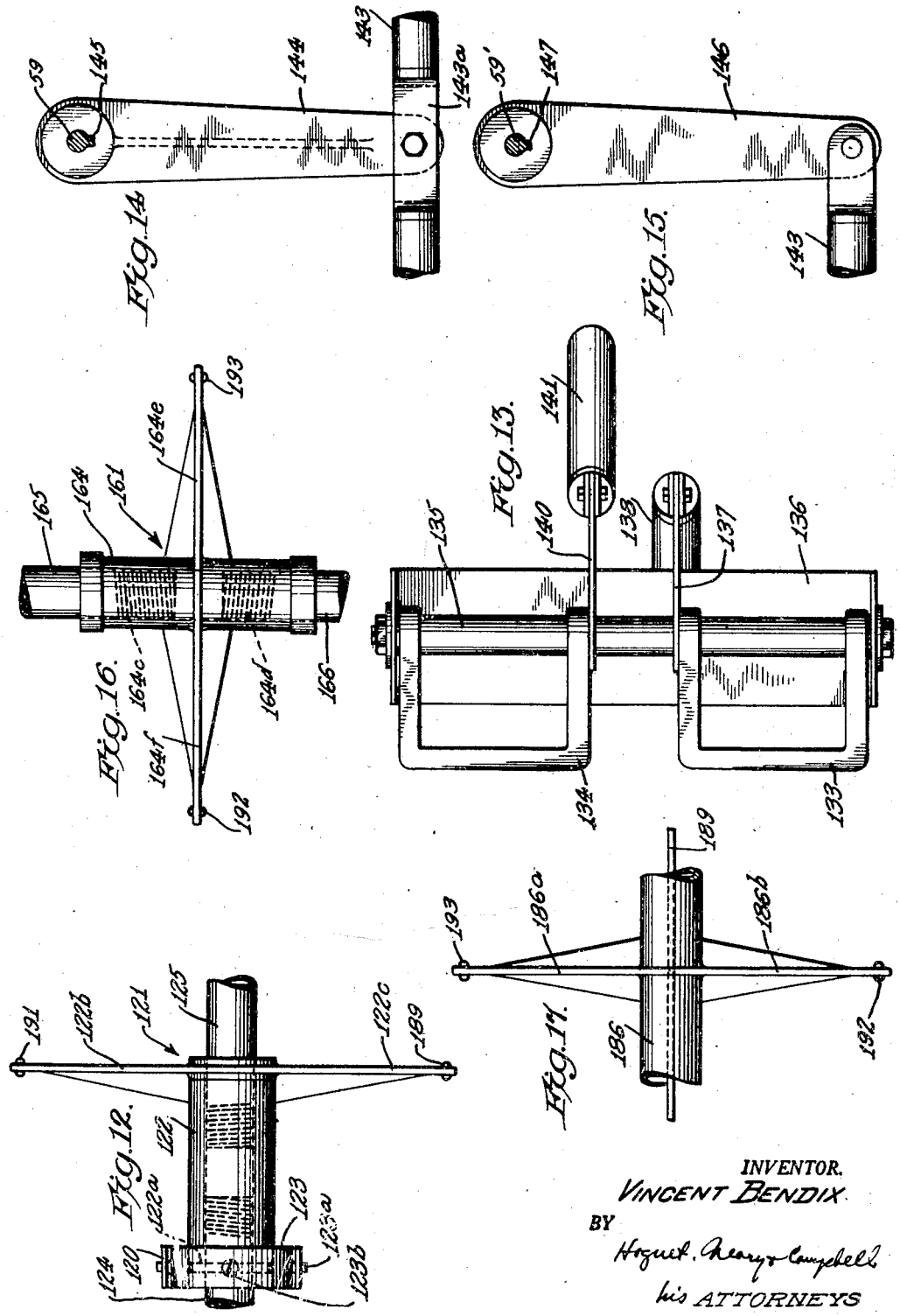

Patented Jan. 21, 1947

2,414,435

UNITED STATES PATENT OFFICE 2,414,435

HELICOPTER BUS

Vincent Bendix, Flemington, N. J., assignor to Bendix Helicopter, Inc., New York, N. Y., a corporation of Delaware Application March 30, 1944, Serial No. 528,731

16 Claims. (Cl. 244—17)

This invention relates to improvements in helicopters It relates particularly to improved forms of helicopters having a plurality of sets of coaxial, counter-rotating rotors and to the control mechanism therefor, whereby movement in any direction and pitching and rolling about the transverse and longitudinal axes and turning about the vertical axis of the helicopter may be attained and controlled.

In my copending application Serial No. 511,408, filed November 23, 1943, a form of helicopter is disclosed having a coaxial, counter-rotating rotor unit and the various controls therefor. This form of helicopter is characterized by rotor wings having mechanisms, such as flaps or blades, mounted thereon whereby the sectional shape of the wings can be changed cyclically to propel the helicopter in a horizontal plane, to vary the lift of the wings, to compensate for variation in air speed in the rotor wings, and to correct for or to cause pitching and/or rolling and turning of the helicopter.

The present invention constitutes an improvement over the disclosure of the above-mentioned application, and has as an object the provision of a helicopter which is capable of lifting and transporting greater loads than is possible with a single or double rotor helicopter.

Another object of the invention is to provide helicopters having a plurality of counter-rotating, coaxial rotor units connected by a centralized system for controlling the movements of the helicopter.

Another object of the invention is to provide helicopters with a plurality of interconnected counterrotating, coaxial rotor units driven by a plurality of engines each of which can drive all of the rotors, whereby failure of one or more of the engines will not disable any of the rotors.

Other objects and advantages of the present invention will become apparent from the following description of typical forms of helicopters embodying the invention.

In accordance with the present invention, I have provided a helicopter having a high load carrying capacity and including a plurality of rotor units generally of the type disclosed in my application Serial No. 511,408. The helicopter may be used as a multi-passenger bus or a cargo carrier and is provided with a body of appropriate type. In order to control the action of the rotor units, I provide a centralized control system of novel type that interconnects the units so that the various adjustments to which each of the units is susceptible may be made to change the direction of flight or propel the helicopter in any direction, maintain it level in flight and control the pitching and rolling of the helicopter.

More particularly, the control system for my multi-rotor unit helicopter includes centralized means for varying the pitch of the rotors to control ascent and descent of the helicopter and to cause a change in direction of the helicopter when desired. Moreover, the centralized control system includes means which is capable of varying, at will, the lift of the wings of the rotors in order to overcome rolling or pitching of the helicopter and thereby maintain it level in flight and offset any tendency toward instability of the helicopter. In addition, the control system includes control mechanism for varying the sectional shape of the wings, for example, by varying the extent of projection of the propelling blades on the wings in order to vary the speed and the direction of flight as well as the lift of the wings.

The control system described generally above permits the use of two or more of the rotor units so that the lifting effect obtainable therewith may be multiplied without excessively increasing the size of the individual rotors to such an extent that they would be weakened or would be unwieldly or ungainly.

For a better understanding of the present invention, reference may be had to the accompanying drawings, in which:

Figure 1 is a view in side elevation of a typical form of helicopter embodying the present invention;

Figure 2 is a plan view of the helicopter of Figure 1;

Figure 3 is a front view of the helicopter;

Figure 7 is a view of the rotor units illustrating connections therebetween for coupling the units for synchronous operation;

Figure 8 is a view in cross-section of a form of differential used for coupling the rotor units;

Figure 9 is a view, partly in section, of another coupling element for the rotor units;

Figure 10 is a view in side elevation and partly in section and broken away illustrating details of the universal joints utilized in coupling the rotor units;

Figure 11 is a diagrammatic showing of a typical form of control system for a two rotor unit helicopter; and Figures 12–17, inclusive, are views of details of the elements of the control mechanism.

Figure 4A:
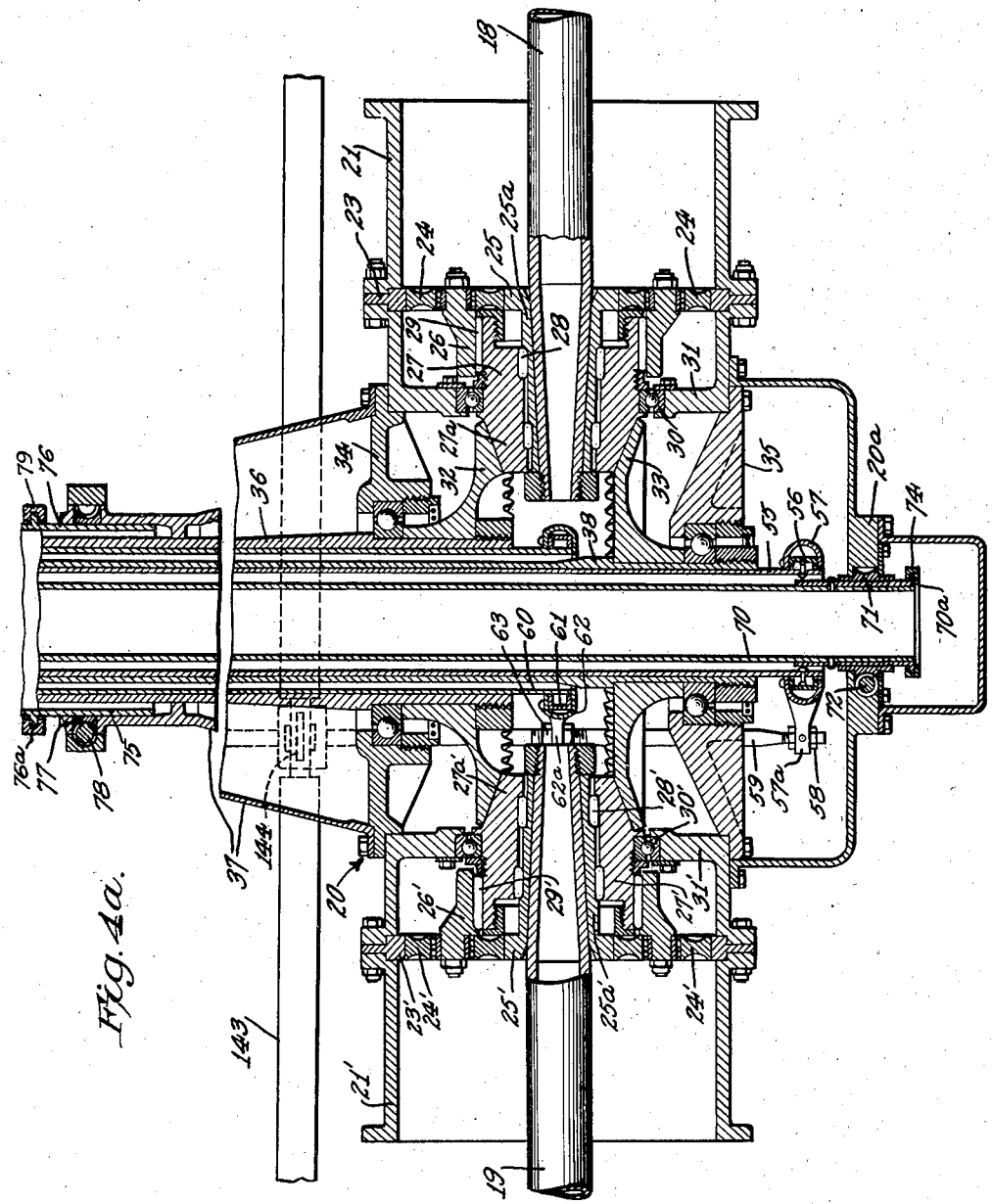
Figures 4a and 4b are views in vertical section and partly broken away of a rotor unit of the type used in the helicopter.

The form of helicopter chosen to illustrate the present invention and disclosed in Figures 1, 2 and 3, includes a bus-like body 10 of generally aero-dynamic form and being relatively long and narrow in order to reduce the wind resistance thereof. The body 10 may be provided with a plurality of observation windows 11 along the sides thereof and provided with two rows of seats, not shown, in the conventional way and a front compartment 12 for the operator or pilot. The lower section 10a of the body may be provided with a plurality of doors 13 closing baggage compartments or access openings therein.

In front and behind these compartments 13 are located other compartments for the motors and indicated generally as to location by the ventilating louvres 10b and 10c at the front and rear of the body 10. The body 10 may be provided, also, with pneumatic tire wheels 14. The front wheels 14′ may be mounted in the manner of the conventional front wheels of buses or other vehicles in order to permit the helicopter to be steered along the ground. If desired, floats may be substituted for the wheels 14, 14′. Moreover, the body may be modified to suit it for freight instead of passengers, as desired.

As shown particularly in Figures 1 and 2, the bus is provided with a pair of coaxial, counter-rotating rotors 15 and 16 adjacent its forward end and with a similar pair of coaxial, counter-rotating rotors 15′ and 16′ adjacent the rear end of the vehicle. The front rotor unit 17 includes the rotors 15 and 16, a transmission and one or more motors for driving the rotors. Usually, two motors is the most desirable number. The rear rotor unit 17′ includes the rotors 15′ and 16′, a transmission and motors for driving the rotors like those of the rotor unit 17.

The individual rotor units 17 and 17′, of which the rotor unit 17, only, will be described herein, are similar to the rotor unit disclosed in my co-pending application Serial No. 511,408.

Figure 4B:
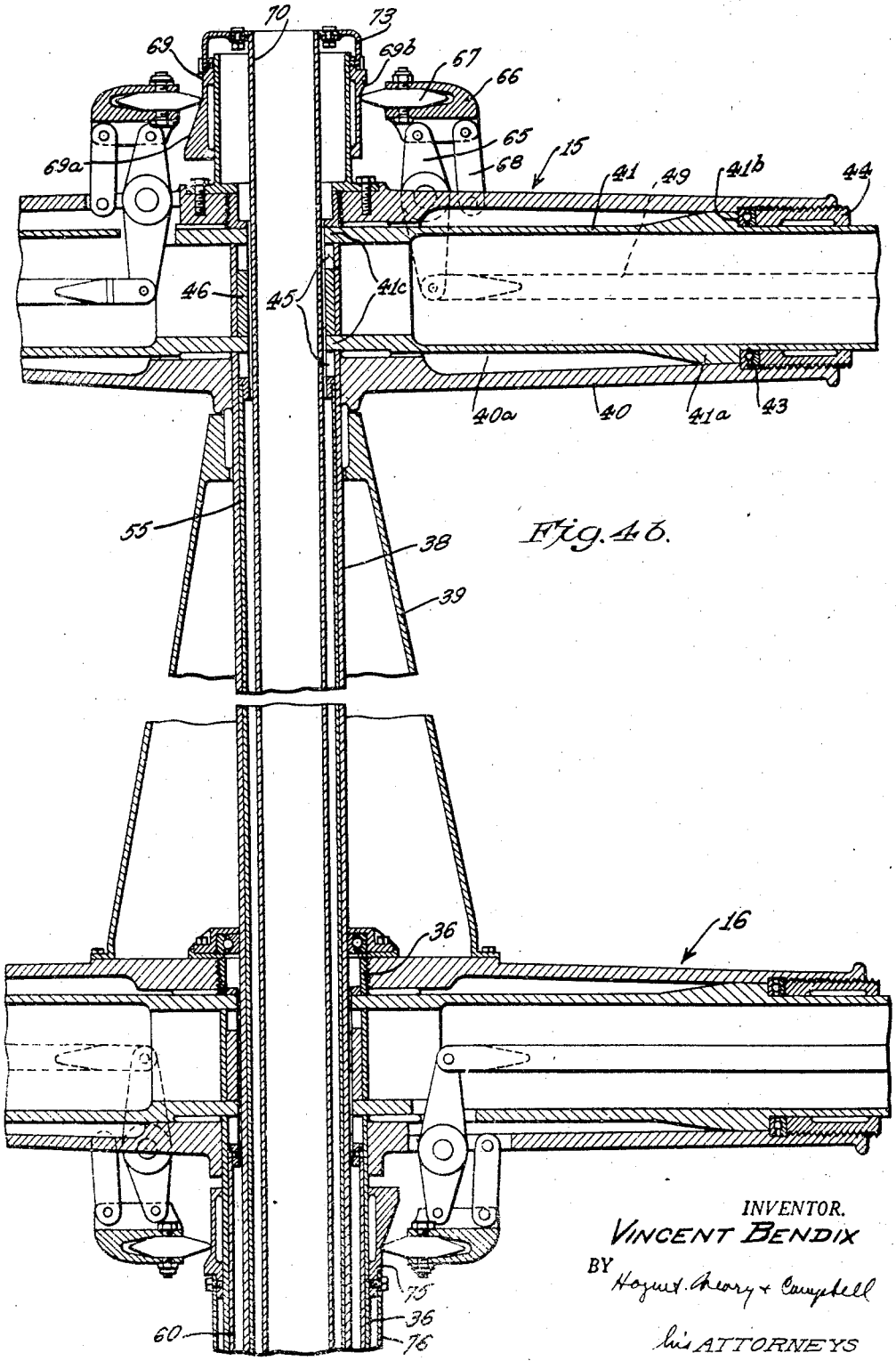

Referring now to Figures 4a and 4b, each rotor unit preferably is provided with a pair of engines, not shown, which may be of the radial air-cooled type, if desired. These engines are provided respectively with the driveshafts 18 and 19 which are in axial alignment and project into the opposite sides of a gear housing 20. The gear housing 20 is provided with a generally cylindrical extension 21 in which is mounted a ring gear 23 cooperating with a series of planet gears 24, and a sun gear 25, that is fixedly mounted on the driveshaft 18. The planet gear system described above effects a reduction in speed between the driveshaft 18, for example, and the sleeve 26 upon which the planet gears 24 are rotatably supported. The sleeve 26 cooperates with a second sleeve 27 supported by means of roller bearings 28 on a sleeve 25a fixed to the sun gear 25 and concentric with the shaft 18 to form an over-running clutch in which the rollers 29 form the coupling elements between the sleeves.

The sleeve 27 is suitably supported in an anti-friction bearing 30 carried by a partition 31 in the housing 20.

The sleeve 27 is provided with a bevel gear 27a which meshes with a pair of bevel gears 32 and 33 journaled in the end plates 34 and 35 of the housing 20, for rotation in opposite directions by the bevel gear 27a.

The driveshaft 19 is coupled in a similar manner to the bevel gears 32 and 33 and inasmuch as it is driven in the opposite direction from the shaft 18, it tends to rotate the gears 32 and 33 in the same direction. The elements connecting the shaft 19 to the gears 32 and 33 corresponding to the elements 21, 23, 24, 25, 25a, 26, 27, 27a, 28, 29, 30 and 31 are identified as the elements 21′, 23′, 24′, 25′, 25a′, 26′, 27′, 27a′, 28′, 29′, 30′ and 31′.

Inasmuch as the bevel gears 27a and 27a′ on the shafts 18 and 19 are capable of overrunning the shafts 18 and 19, stoppage of either of the shafts 18 or 19 will not stop the rotation of the gears 32 and 33. On the contrary, these gears will overrun either or both of the shafts 18 and 19 so that the rotors 15 and 16 associated therewith can continue to rotate even with both of the motors stopped.

The rotor 16 is carried by a tubular shaft 36 that is fixedly connected to the gear 32 and rotatable therewith. This shaft is journaled in the upper end of a conical housing 37 that is supported on the top of the gear housing 20 so as to stiffen and prevent whipping or bending of the shaft 36.

The rotor 15 is similarly mounted on a tubular shaft 38 that is fixed to the gear 33 and extends upwardly within and concentric with the shaft 36. The shaft 38 projects beyond the end of the shaft 36 and is journaled in a generally conical housing 39 fixed to the upper surface of the rotor 16.

Figure 5:
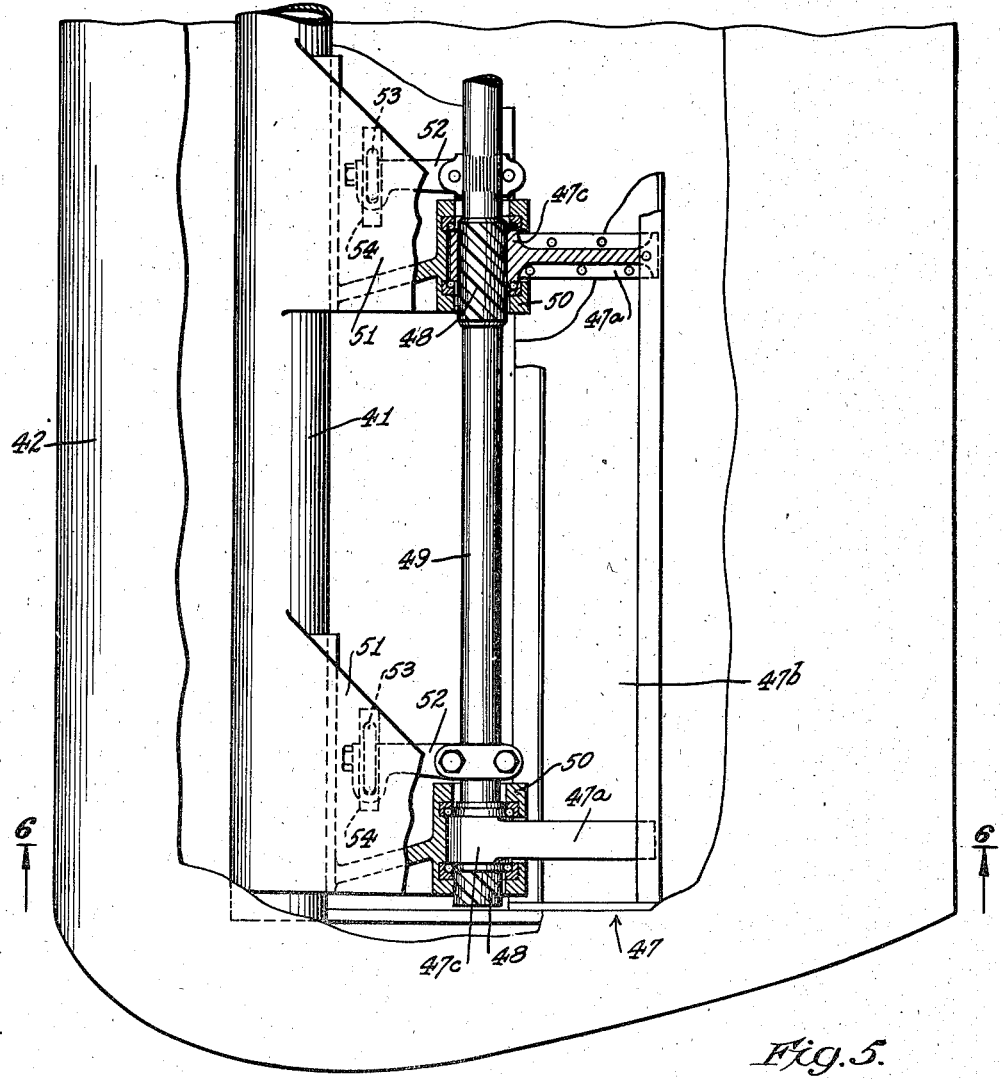
Figure 5 is a view, partly in section, of a portion of a rotor wing.
Figure 6:
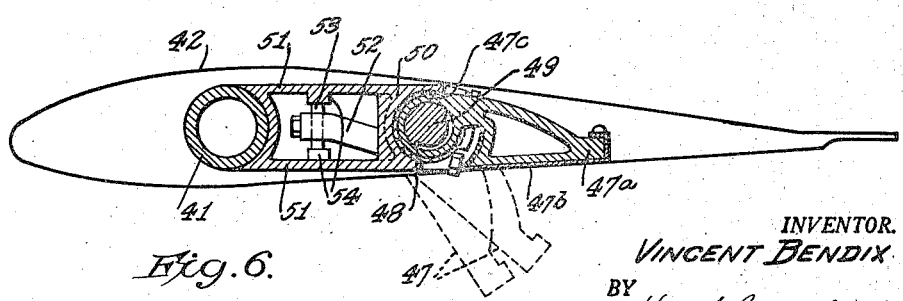
Figure 6 is a view in section taken on line 6—6 of Figure 5.

Referring now to Figures 4b, 5 and 6, each of the rotors 15, 16, 15′ and 16′ is generally the same with the exception that the wings of the rotors 15, 15′ face in the opposite direction from the wings of the rotors 16 and 16′. Inasmuch as these rotors are substantially the same, only one of them will be described herein. Each of the rotors, for example, rotor 15, includes a hub portion 40 that is fixed to the end of its corresponding driveshaft, for example, the driveshaft 38. The hubs 40 are of generally tubular formation and are provided with sockets 40a for receiving one end of a tubular spar 41 that extends substantially throughout the length of the rotor wings 42. As shown particularly in Figure 4b, the end portion 41a of the spar 41 is provided with a shoulder 41b that engages a thrust bearing 43 that is retained in the end of the hub 40 by means of a threaded sleeve 44. The thrust bearing 41b prevents the spar 41 from being thrown outwardly by centrifugal force. The inner end of the section 41a of the spar is provided with a pair of diametrically spaced lugs 41c that engage in oppositely inclined slots 45 in a sleeve 46 that is mounted concentrically within the shaft 38 and pinned thereto against rotation, but capable of axial sliding movement. Axial movement of the sleeve 46 will cause a rocking or rotation of the spar 41 about its axis to vary the pitch of the wing 42, as will be described.

Each of the wings 42 is of aero-dynamic cross-section, as shown in Figure 6 of the drawings. The spar 41 which extends axially of the wing stiffens or rigidifies the wing longitudinally and thereby prevents distortion of the wing. The spar 41 also acts as a support for the actuating mechanism for a flap-like propeller blade 47 which is movable from a position within the section of the wing 42 to positions projecting from the wing as illustrated in dotted lines. The propeller blades 47 may include a plurality of hollow rib-like members 47a, the lower surfaces of which are covered with a metallic skin 47b so that when the blades are disposed within the section of the wing, a substantially continuous outline is provided. Each of the ribs is provided with a tubular portion 47c having spiral threads or teeth therein for cooperation with complemental spiral teeth or threads 48 on a shaft 49 that extends longitudinally of the wing 42 substantially parallel to the spar 41. The tubular portions 47c of the blade ribs are suitably journaled in tubular journal members 50 that are supported by pairs of webs 51 that project rearwardly from the spar 41. Thus, the propeller blade is capable of pivotal movement about the axis of the shaft 49, and the shaft 49 is supported by the tubular portions 47c and the journal members 50. Because of the threaded connection between the shaft 49 and the ribs 47a, axial movement of the shaft 49 inwardly will project the propeller blades 47 and axial movement outwardly will retract the propeller blades.

In order to prevent rotation of the shaft 49, the latter is provided with arms 52 projecting therefrom which carry adjacent their ends rollers 53 that engage the tracks 54 carried by the webs 51 on the spar 41.

By providing the proper thread on the shaft 49, the movements of the shaft and the propeller blades may be coordinated so that centrifugal force acting on the shaft 49 will tend to retract the propeller blades 47 and inward movement of the shaft 49 will tend to project the propeller blade.

From the preceding description of the support and the structure of the rotors and the rotor wings, it will be apparent that the rotors can be varied in pitch and the propeller blades can be projected and retracted relatively to the wings.

The mechanism for varying the pitch of the rotor wings is disclosed in Figures 4a and 4b. As shown particularly in Figure 4b, the pitch-varying sleeve 46 is supported by a tubular shaft or sleeve 55 mounted concentrically within the shaft 38 and extending down into the housing 20. The lower end of the sleeve 55 is provided with a collar 56 fixed thereto which is received rotatably in a ring-like channel member 57 forming a portion of a lever that is pivotally supported in the lower end of the housing 20. The opposite end 57a of the member 57 is provided with a pivotally movable internally threaded sleeve 58 that receives the lower threaded end of a rod 59 extending vertically in the housing 20 and having an upper end projecting therefrom.

The lower rotor 16 has a similar pitch-varying sleeve and shaft 60 that extends downwardly into the housing 20 and is similarly provided with a collar or flange 61 rotatably received in the lever 62. The free end 62a of the lever 62 is provided with a pivotally mounted internally threaded sleeve 63 that engages an oppositely threaded portion of the shaft 59 whereby upon rotation of the shaft 59, the sleeve shafts 55 and 60 are moved in opposite directions and upon axial movement of the shaft 59, the sleeve shafts 55 and 60 move in the same direction simultaneously. Thus, upon axial movement of the shaft 59, the pitch of the blades of the rotors 15 and 16 can be varied simultaneously in the same sense. Upon rotation of the shaft 59, the pitches of the rotors are varied in opposite senses. In this way, the lift of the rotors can be equalized, if desired, or the torque reaction of the rotors varied so as to tend to cause the housing 20 and the motors affixed thereto to rotate in the opposite direction to the direction of rotation of the rotor having the greater pitch angle. Such variation in the torque reaction can be utilized to steer or turn the helicopter.

The projection and retraction of the propeller blades 47 is varied in order to propel the helicopter in a desired direction, to compensate for variation in lift due to variation in air speed of the rotor wings and to cause rolling of the helicopter. Thus, when the propeller blades 47 on the wings of the rotors 15 and 16 that are traveling rearwardly are projected an equal amount and for an equal period of time, there is created a rowing action which tends to propel the helicopter forwardly. At the same time, the sectional shape of the wing is altered and increased lift is imparted to that wing having the projected propeller blade. Such increased lift tends to compensate for the decreased lift that is caused by motion of the entire helicopter in a direction opposite to the direction of motion of the wing or to compensate for the decreased air speed of the rearwardly moving wing as compared with the increased air speed of the forwardly moving wing at the opposite side or end of the rotor. Such compensation for air speed tends to increase the stability of the rotor system and to reduce the tendency of the wings to vibrate in a vertical plane as they rotate.

The mechanism for actuating and controlling the propeller blades will now be described.

Each of the propeller blades is provided with mechanism for causing the shaft 49 to reciprocate axially of the blade. As illustrated, the inner end of the shaft 49 is connected to the one end of a lever 65 that is pivotally mounted on the rotor hub and has its other end pivotally connected to a carrier 66 for a roller 67. A second parallel lever 68 is also connected to the hub 40 and the roller carrier 66 to maintain the roller substantially perpendicular to the axis of the driveshafts 38 and 39. The roller 67 on the rotor 15 cooperates with a cam sleeve 69 that is carried by a tubular shaft 70 concentric with the driveshaft 38, disposed within the shaft 55 and extending downwardly into the bottom of the casing 20. The shaft 70 is provided with a worm gear 71 that meshes with a worm 72 rotatably mounted in the bottom section 20a of the casing 20 so that upon rotation of the worm 72, the shaft 70 can also be rotated, as well as the cam sleeve 69 carried at the upper end of the shaft. The cam sleeve 69 is also supported for axial movement and rotation upon a collar 73 carried by the hub 40 of the rotor 15.

In addition to rotary movement of the shaft 70, it is capable of axial movement relatively to the worm gear 71 mounted thereon by means of a shiftable collar 74 that engages rotatably a flange 70a on the bottom of the shaft 70. In order to permit such axial movement of the shaft 70, the worm gear 71 may be splined to the shaft 70.

The cam sleeve 69 may be provided with two substantially oppositely directed cams 69a and 69b adjacent the opposite ends of the sleeve. The cams 69a and 69b have similar shapes but the cam 69a is, however, higher than the cam 69b and these cams face in opposite directions.

With the cam sleeve 69 in the position illustrated in Figure 4b, rotation of the rotor 15 relatively thereto will cause the roller 67 to roll on a cylindrical portion of the cam 69 and due to air pressure on the propeller blades 47 and centrifugal forces on the shaft 49, the propeller blades will not be projected. If the cam sleeve 69 is moved upwardly from the position shown, the rollers 67 when passing over the cam lobe 69a will be displaced outwardly, drawing the shafts 49 inwardly in succession and thereby projecting and retracting the propeller blades 47 on the opposite wings of the rotor 15 successively and in the same sectors of the circle of rotation of the rotors. As the cam sleeve 69 is moved upwardly to a still greater extent, the propeller blades 47 will be projected from the wing a correspondingly greater distance and over a correspondingly wider arc, thereby exerting a greater thrust on the air.

If the sleeve is moved downwardly so that the rollers 67 engage the cam 69b, the same effect will be obtained, except the blades will be projected in an arc spaced diametrically from the arc in which the blades are projected by the cam 69a. This action may be utilized, for example, to cause the helicopter to move backwardly rather than forwardly.

By rotating the cam sleeve 69, the arc of the circle of rotation may be displaced correspondingly so that the angle of thrust of the blade may be changed with respect to the longitudinal axis of the helicopter and the lift exerted by such propeller blades exerted in a different sector of the circle of revolution. This rotary adjustment may be used for trimming or equalizing the propulsion effect of the rotors of the unit.

The cam mechanism for the rotor 16 is similar in that it includes a cam sleeve 75 mounted beneath the rotor 16 and carried by the tubular shaft 76 which projects downwardly into the conical casing 37 and is rotatably mounted within it with capacity for axial movement. As shown particularly in Figure 4a, the shaft 76 is splined to a worm gear 77 that cooperates with a worm 78 mounted in the housing 37. The lower end of the shaft 76 is provided with a flange 76a which may be moved up and down to vary the axial displacement of the cam. A ring 79 is rotatably mounted on the flange 76a, as shown in Figures 4a and 11.

As shown in Figure 4b, the cam sleeve 75 is rotated with respect to the cam sleeve 69 so that the propeller blades on the rotor 16 will be projected through an arc on the opposite side of the longitudinal axis of the helicopter from the arc through which the propeller blades on the rotor 15 are projected in order to provide a rowing action for propelling the helicopter.

The above-described rotor unit, therefore, is provided with means for simultaneously or variably changing the pitch of the rotors of the unit, a mechanism for projecting and retracting the propeller blades on the rotors and an adjusting mechanism for varying the extent of projection of the propeller blades.

As disclosed in Figures 1–3 and 7, two of the rotor units 17 and 17' are utilized for lifting and propulsion of the vehicle.

The two units may be synchronized or governed to operate at the same speed, but preferably they are interconnected as shown in Figure 7 by means of suitable connecting shafts, universal joints and a reversing gear in order to permit the corresponding rotors to rotate in the same direction. Thus, the rotor unit 17 is provided with a reversing gear mechanism 80 which drives a shaft 81 that is connected by means of a universal joint 82 to another substantially coaxial shaft 83. This latter shaft is connected by means of a universal joint 84 to another shaft 85 that is connected by means of a coupling 86 to the rotor unit 17'.

The reversing gear 80 is illustrated more particularly in Figure 8 of the drawings and includes a hollow generally cylindrical casing 87 provided with a bearing 88 at its left-hand end for receiving a double bevel gear 89. One gear element 89a meshes with the bevel gears 32 and 33 within the housing 20 and extends thereinto at substantially a right angle to the axis of the shafts 18 and 19. The casing 87 may be secured to the housing 20 by means of bolts or other fastening means extending through the flange 87a on the casing 87.

The bevel gear 89b meshes with a pair of differential gears 90 and 91 that are mounted for rotation about an axis at a right angle to the axis of the gear member 89. The gears 90 and 91 may be provided with bushings 92 and 93, respectively, through which pass a bolt 94 that extends transversely of the casing 87. A spacer member 95 is also supported on the bolt 94 in order to maintain the gears 90 and 91 in proper spaced relationship. These gears in turn mesh with a bevel gear 96 which is splined to a shaft 81 that is supported in suitable anti-friction bearings 98 in a reduced portion 87b of the casing 87. The bearing 98 may be retained in engagement with an internal shoulder 87c by means of an annular retaining plate 99.

The bevel gear 96 is retained on the shaft by means of a nut 100 threaded on the end of the shaft 81 and the shaft is maintained otherwise against axial movement by means of a flange 81a thereon.

The coupling 86 between the shaft 85 and the unit 17' is shown in Figure 9. This unit includes a generally frusto-conical housing 101 having an anti-friction bearing 102 supported in its larger end for receiving rotatably a bevel gear 103 that meshes with the gears of the unit 17' corresponding to the gears 32 and 33 of the unit 17. The bevel gear 103 is splined to the end of the shaft 85 and is provided with a sleeve portion 103a concentric with the shaft 85. The gear 103 is retained on the shaft 85 by means of a nut 104 threaded on the end of the shaft and a collar 85a fixed to the shaft and bearing against the inner race of an anti-friction bearing 105. The opposite side of the race is engaged also by the sleeve 103a. The above-described arrangement prevents endwise shifting of the gear 103 and the shaft 105.

The universals 82 and 84, which are substantially identical, are illustrated more particularly in Figure 10. As shown in section in Figure 10, each of the universal units includes a casing 106 having a reduced portion 106a that is splined to the shaft 81 or 85. The housing 106 is retained on the shaft 81, for example, by means of the nut 107 threaded onto the end of the shaft 81.

The casing 106 is provided with inner peripheral teeth 108 which engage arcuate teeth 109a on the cooperating universal unit 109. The arcuate teeth 109a permit relative rocking of the casing 106 and the member 109 as well as relative axial movement, if necessary. The inner universal unit 109 is provided with a sleeve portion 109b that is splined to the shaft 83 and is also received in an anti-friction bearing 110 that may be supported by a journal member 111 fixed to a portion of the body of the helicopter. The shaft 83 and the member 109 are retained in fixed relationship by means of a nut 112 bearing against the end surface of the member 109 and threaded on the end of the shaft 83.

The above-described connections between the rotor units 17 and 17' permit ready alignment of the shafts 81, 83 and 85 or compensate for slight misalignment. The differential unit 80 operates to cause the motors to drive both units 17 and 17' in the same direction. In this way, the device can be operated on fewer than the total number of engines provided in the device. Both sets of rotor units 17, 17' can be driven by the motors of one of these units or one motor of each unit.

The control system for the device is disclosed diagrammatically in Figure 11 of the drawings and details of the various elements of the control are shown more particularly in Figures 12-17 of the drawings. As shown in Figure 11, the two rotor units 17 and 17' are disposed in approximate alignment and preferably rearwardly of the pilot's seat 115. A plurality of manually operated levers and foot pedals are provided for giving the necessary control over the operation of the rotor units of the device. In order to vary the pitch of the rotors of the two units 17 and 17' to vary the lifting effect as in taking off and landing, a control lever 116 is pivotally supported adjacent the seat 115. This lever 116 has its rear end portion connected by means of a link 117 to a pivotally supported bell crank lever 118. The other arm of the bell crank lever is connected by a link 119 to the lower end of a lever 120 which may be pivotally mounted on the rotor unit 17 or on an adjacent portion of the body 10 of the helicopter. The upper bifurcated end of the lever 120 is connected to a control member 121, shown more particularly in Figure 12 of the drawings. As shown in Figure 12, the member 121 consists of a tubular portion 122 having a collar 123 rotatably mounted thereon provided with pins 123a that engage the opposite arms of the lever 120. The collar 123 may be provided with one or more set screws 123b that project into an annular groove 122a in the member 122.

The member 122 is also provided with oppositely extending lever arms 122b and 122c for a purpose to be described herein. The opposite end portions of the member 122 are provided with oppositely directed internal threads for engaging the threaded portions of the shafts 124 and 125 so that rotation of the member 122 causes the shafts 124 and 125 to move in opposite directions.

The shaft 124 is coupled to the upper end of a pivotally supported bell crank lever 126, preferably mounted on the rotor unit 17 and having its opposite lever arm connected to the upper end of the shaft 59 by means of a sliding pivot connection 127.

As described above, upward and downward movement of the shaft 59 will cause a change in pitch of the rotors 15 and 16 in the same sense and to the same extent.

The shaft 125 is pivotally connected to the upper end of the lever 128 which is pivotally supported at its mid-portion and has its opposite ends connected by means of the cables 129 and 130 to the corresponding ends of a three-arm lever 131 that is pivotally mounted adjacent the rotor unit 17'. The third arm 131a of the lever is connected by means of a sliding pivot connection 132 to the upper end of the shaft 59' of the unit 17'. The shaft 59' corresponds to the shaft 59 of the unit 17.

Connections described above are such that when the lever 116 is in the position shown, the rotors 15, 16, 15' and 16' are in neutral pitch position. When the lever 116 is moved in a clockwise direction or upwardly, the pitch of each of these rotors is increased, as, for example, when it is desired to "take off."

In order to steer the helicopter, the helicopter is provided with a pair of pedals 133 and 134, shown in Figures 11 and 13. As shown in Figure 13, the pedals may consist of U-shaped members having their ends journaled on a shaft 135 that is fixed in a U-shaped bracket 136. The pedal 133 is provided with a rearwardly projecting lever arm 137 that is pivotally connected by means of a link 138 to one arm 139a of a three-arm lever 139. The pedal 134 is also provided with a rearwardly extending lever arm 140 that is connected by means of a link 141 to the opposite arm 139b of the lever 139. The lever 139 is suitably supported for pivotal movement in a bracket 142 fixed to the framework of the helicopter body 10. The lowermost arm 139c of the lever 139 is connected by means of a link or rod 143 to a lever 144, best shown in Figure 14. The lever 144 is slidably, but non-rotatably, supported on the shaft 59 by means of a spline, or key and slot connection 145. The outer end of the lever 144 may be connected pivotally to a reduced portion 143a of the shaft 143. The opposite end of the shaft 143 is connected to a lever 146, best shown in Figure 15 of the drawings. The lever 146, like the lever 144, is slidably, but non-rotatably, connected to the shaft 59' by means of a spline, or key and slot connection 147.

The above-described construction affords a means of varying relatively the pitches of the rotors 15, 15' and the pitch of the rotors 16 and 16'. Thus, if the pedal 133 is depressed, the lever 139 is rocked in a clockwise direction, moving the shaft 143 to the left and rotating the shafts 59 and 59' in a clockwise direction, as viewed from above, thereby increasing the pitch of the rotors 15 and 15' and decreasing the pitch of the rotors 16 and 16'. The unequal torque reaction created by varying the pitch and the torque of the rotors tends to turn the helicopter to the left in the direction of the depressed pedal 133. Similarly, depression of the right-hand pedal 134 increases the pitch of the rotors 16 and 16' and decreases the pitch of the rotors 15 and 15' causing the helicopter to turn to the right.

In order to control the action of the propeller blades 47 in propelling the helicopter, a second lever 150 is provided adjacent the lever 116. The lever 150 has a cable 151 connected thereto above its pivot point which extends over the pulleys 152 and 153 to a coupling yoke 154. Similarly, the lower end of the lever 150 below its pivot is connected by means of a cable 155 passing over the pulleys 156 and 157 to a coupling yoke 158.

The coupling yokes 154 and 158 are connected to each other by means of a cable 159 that passes over a roller 160 and is connected to a control unit 161 and through the control unit 161 by means of a cable 162 that passes over a pulley 163 to the coupling member 158. Thus, upon movement of the lever 150, the cables described above cause the coupling yokes 154 and 158 to move in opposite directions and the member 161 is moved up or down. The member 161 is best shown in Figures 11 and 16 of the drawings. This member includes a tubular sleeve 164 having the pairs of lugs 164a and 164b thereon to which the cables 159 and 162 are connected, respectively. The opposite ends of the member 164 are provided with oppositely directed internal threads 164c and 164d which receive the threaded shafts 165 and 166. The coupling member 164 is also provided with oppositely directed lever arms 164e and 164f by means of which the coupling sleeve 164 can be rotated. The upper shaft 165 is pivotally connected to a pivotally mounted lever 167 which has its opposite end coupled to the collar 79 by means of which the shaft 76 is moved upwardly and downwardly. As described above and shown in Figure 4b, the shaft 76 carries the cam sleeve 75.

The shaft 166 is connected to one end of a pivotally supported lever 168, the opposite end of which is connected by a link 169 to another lever 179. The lever 179 is mounted on a shaft 180 which carries a fork 181 that engages the collar 74 at the lower end of the sleeve shaft 70, as shown in Figures 4a and 11. The upper end of the shaft carries the cam sleeve 69, as described above.

The coupling yoke 154 is also connected by means of a cable 182 to another member 164' similar to that described above and this member is in turn connected by means of a cable 183 to the coupling yoke 158. The member 164' is connected to the corresponding cam sleeve shafts of the unit 17' in the same manner as the member 164 is connected to the shafts 70 and 76. Thus, upon movement of the lever 150, the coupling members 164 and 164' associated with the units 17 and 17' move up and down together. Such movement of the members 164 and 164' will cause a corresponding shift of the cam sleeves 69 and 75 of unit 17 and the corresponding cam sleeves of the unit 17', in such a manner that forward movement of the control lever 150 will cause the propeller blades 47 to be projected from the rotors 15, 15', 16 and 16' during their rearward movement relatively to the axis of the helicopter body 10, thereby propelling the helicopter forwardly. When the lever 150 is drawn backwardly, the cams 69 and 75 are shifted so that the follower rollers 67 will engage the rearward motion cams 69b and 75b and will cause propeller blades 47 to be projected in such a manner as to cause the helicopter to move backwardly.

The above-described controls regulate the forward or rearward movement of the helicopter, the turning movement of the helicopter and the rising and settling movements thereof. Other controls are required to correct for unwanted motions of the helicopter, for example, pitching movement or rolling movement or to cause pitching and/or rolling to maintain the helicopter in level flight. The mechanism for controlling motion about the longitudinal and transverse axes of the helicopter will now be described.

Adjacent to the pilot's seat 115 and convenient for manipulation by the pilot is a third pitching and rolling control lever 185. The lever 185 has its lower end pivotally connected to a tubular member 186 which is rotatably mounted in suitable bearing members 187 supported on the floor of the pilot's compartment. The forward end of the tube carries a pulley 188 having its lower edge coinciding substantially with the axis of the tube 186. In addition, as shown in Figure 17, the tube is provided with laterally projecting lever arms 186a and 186b.

The lever 185 is connected to a cable 189 which passes over the pulley 188 and then extends through the tubular member 186, over the pulley 190 and downwardly to the member 121, and is connected to the arm 122c thereof. The lever 185 is also connected by means of a cable 191 to the lever arm 122b of the member 121. Thus, upon forward movement of the control lever 185, the lever 122b is lifted, while the lever arm 122c is depressed, as viewed in Figure 12, thereby rotating the tube 122 in such a direction as to move the shafts 124 and 125 toward each other. As a result, the shaft 59 is moved downwardly, while the shaft 59' of the rotor unit 17' is raised. The opposite directions of motion of the shafts 59 and 59' cause a variation in pitch of the wings of the rotor units 17 and 17'. The forward movement of the stick will tend to cause an increase in the pitch of the wings of the rotor unit 17' and a decrease in the pitch of the wings of the rotor unit 17 and will tend to depress the forward end of the helicopter and raise the back end of the helicopter. Similarly, rearward movement of the control lever 185 will increase the pitch of the wings of the forward rotor unit 17 and decrease the pitch of the wings of the rear rotor unit 17' with the result that the helicopter will tend to nose up about its transverse axis.

Rolling of the helicopter about its longitudinal axis is controlled by right and left movement of the control lever 185. As indicated above, the member 186 is rotatably mounted and, therefore, this member moves with the control lever 185 in its rocking movements to the right and left. In order to utilize such rocking movements, the lever arm 186b is connected by means of a cable 192 to the lever arm 164f of each of the members 161 and 161'. The other arm 186a is connected by means of a cable 193, Figure 17, to the arm 164e of the members 164 and 164' of the rotor units 17 and 17'. Thus, upon movement of the control lever 185 to the left with relation to the pilot's position will exert a pull on the cable 193 and a slackening of the cable 192 so that members 161 and 161' are both rotated in a clockwise direction. Such clockwise rotation will tend to move the shafts 165 and 166 toward each other, thereby moving the two cam sleeves 69 and 75 of each unit upwardly, as viewed in Figure 11.

Such upward movement of the cam sleeve 69, assuming that the helicopter is travelling forwardly, will increase the extent of projection of the propeller blades of the rotor 15 and will decrease the extent of projection of the propeller blades on the rotor 16. This adjustment will decrease the lift of the rotors 16 and 16' during their rearward movement in their circle of rotation and will increase the lift of the rotors 15 and 15', thereby tending to roll the helicopter about its longitudinal axis toward the left or in the direction of movement of the control lever 185. Similarly, movement of the control lever 185 to the right will cause the helicopter to roll to the right about its longitudinal axis. These controls are effective even when the power to the rotors is completely shut off and the rotors are windmilling.

In addition to the propulsion effect obtained by means of the propeller blades, the axes of the rotors may be placed at a small angle to the vertical so that there will be a thrust component in a direction to urge the helicopter forward, when the body 10 is horizontal, thereby increasing the speed of the helicopter. During vertical ascent and descent, it will be necessary with this arrangement to tilt the body 10 with respect to the horizontal.

From the above description, it will be apparent that I have provided a control system whereby the direction of flight can be controlled, the helicopter can be caused to turn right or left, as desired, and can pitch about its transverse axis as well as roll about its longitudinal axis in response to operation of the various controls. By proper coordination of these various controls, the helicopter can be caused to rise vertically, travel forwardly or rearwardly and be maintained in level flight with any of these motions.

While I have described the invention with reference to a specific embodiment of the same, it will be understood that other types of control mechanisms operating in a similar manner may be used without departing from the invention. Therefore, the form of the invention described above should be considered as illustrative and not as limiting the scope of the following claims.

I claim:

1. In a helicopter, the combination of an elongated body, a rotor unit adjacent each end thereof, each rotor unit comprising a pair of coaxial, variable pitch rotors, and means for rotating the rotors in opposite directions, means for controlling the pitch of each of the rotors and means including control connections interconnecting the pitch control means of both units for varying the pitches of the rotor units rotatable in one direction in one sense and varying the pitches of the rotors rotatable in the opposite direction in the opposite sense, and including control connections for simultaneously varying the pitches of the rotors of one unit in one sense and the pitches of the rotors of the other unit in the opposite sense.

2. In a control system for a helicopter having a plurality of counter-rotating, coaxial rotor units, each unit being provided with at least two variable pitch rotors; the combination of means for varying the pitch of all of the rotors simultaneously in the same sense, means for varying the pitches of the rotors of the units rotatable in one direction in one sense and varying the pitches of the rotors rotatable in the opposite direction in the opposite sense, and means for simultaneously varying the pitches of the rotors of one of the units in one sense and varying the pitches of the rotors of the other rotor unit in the opposite sense, each of said means being connected with both of said rotor units.

3. In a control system for a helicopter having two rotor units, each rotor unit comprising a pair of variable pitch, coaxial rotors having at least two wings, means for varying the pitch of each rotor, and means for rotating the rotors in opposite directions; a control lever for varying the pitches of all of the rotors of both units simultaneously and in the same sense, steering mechanism connected to said pitch varying means for varying the pitches of the clockwise rotating rotors simultaneously in one sense and varying the pitches of the counter-clockwise rotating rotors simultaneously in the opposite sense and a stabilizing lever movable in one plane for varying the pitches of the rotors of one of said units in one sense and simultaneously varying the pitches of the rotors of another unit in the opposite sense.

4. In a helicopter, the combination of an elongated body; a rotor unit mounted in each end of said body, each unit having a pair of coaxial, variable pitch rotors, means for rotating said rotors in opposite directions and means including a shaft movable axially to vary the pitches of said rotors in the same sense, and rotatable for varying the pitches of said rotors in opposite senses; a first control member connected to the shafts of said rotor units for simultaneously moving said shafts axially; and a second control means for rotating said shafts simultaneously.

5. In a helicopter, the combination of an elongated body; a rotor unit mounted in each end of said body, each unit having a pair of coaxial, variable pitch rotors, means for rotating said rotors in opposite directions, and means including a shaft movable axially to vary the pitches of said rotors in the same sense, and rotatable for varying the pitches of said rotors in opposite senses; a first control member connected to the shafts of said rotor units for simultaneously moving said shafts axially in the same direction; a second control means for rotating said shafts simultaneously; and a third control means for moving said shafts axially in opposite directions.

6. In a helicopter, the combination of an elongated body having a rotor unit adjacent each end thereof, each rotor unit comprising a pair of coaxial variable pitch rotors having at least two wings, means for varying the sectional shape of said wings, and means for rotating said rotors in opposite directions; control means connected to both of said units for selectively varying the pitches of said rotors to regulate their lift and their torque reactions, and other control means connected to both of said units for actuating the sectional shape varying means in predetermined cycles.

7. In a helicopter, the combination of an elongated body of aerodynamic shape, a rotor unit adjacent each end thereof, each rotor unit comprising a pair of coaxial, variable pitch rotors, having projectable and retractable propeller blades thereon, and means for rotating the rotors in opposite directions; means connected to both of said units for controlling the pitches of the rotors of said units to vary the lifting effect and torque of said rotors and means for cyclically projecting and retracting the propeller blades and for varying the extent of projection of said blades, whereby the body may be caused to roll about its longitudinal axis, pitch about its transverse axis and turn about its vertical axis.

8. In a helicopter, the combination of an elongated body having a rotor unit adjacent each end thereof, said rotor units each comprising a pair of coaxial, variable pitch rotors having at least two wings, means for rotating the rotors in opposite directions, and means for varying the sectional shape of said wings to vary the lift and thrust of said wings, a control member for varying the pitch of all of said rotors simultaneously and in the same sense, control means for varying the pitch of the rotors of one of said units in one sense and varying the pitch of the rotors of the other unit in the opposite sense, control means for varying the pitches of the clockwise rotating rotors of both units in one sense and varying the pitches of the counter-clockwise rotating rotors in the opposite sense, and control means for varying the sectional shape of said wings, in a desired cycle.

9. In a control system for a helicopter, the combination of a multi-passenger body, at least two counter-rotating, coaxial rotor units, each provided with at least two variable pitch rotors, and each rotor having at least two wings, means for varying the sectional shape of the wings cyclically, control means connected to both of said units for varying the pitches of said rotors selectively in the same sense and in opposite senses, and means connected to both of said units for controlling the sectional shape varying means.

10. In a control system for a helicopter having two rotor units, each rotor unit comprising a pair of variable pitch, coaxial rotors having at least two wings, propeller blades movably mounted on said wings for varying the thrust of the wings in their plane of rotation and the lift of said wings, means for projecting and retracting said blades cyclically, means for varying the pitch of each rotor, and means for rotating the rotors in opposite directions; the combination of a control lever for varying the pitches of all of the rotors of both units simultaneously and in the same sense, steering mechanism connected to said pitch varying means for varying the pitches of the clockwise rotating rotors simultaneously in one sense and varying the pitches of the counter-clockwise rotating rotors simultaneously in the opposite sense and a stabilizing lever movable in one plane for varying the pitches of the rotors of one of said units in one sense and simultaneously varying the pitches of the rotors of another unit in the opposite sense, said stabilizing lever being movable in a plane at a right angle to the first mentioned plane and connected with the means for projecting and retracting the propeller blades of both units to vary the extent of projection of said blades.

11. In a helicopter, the combination of a pair of rotor units, each unit comprising a pair of coaxial, variable pitch rotors having at least two wings, shiftable cam means for varying the sectional shape of said wings cyclically, axially shiftable means for varying the pitches of said rotors, a rotatable and axially movable shaft connecting said axially shiftable means, for varying the pitches of said rotors in the same sense upon axial movement, and in opposite senses upon rotary movement, and means for rotating said rotors in opposite directions; the combination of a control lever connected to said shafts of both of said units for shifting said shafts axially simultaneously to vary the pitches of all of said rotors in the same sense, a universally mounted lever connected to said shafts and to said cam means of both of said rotors for shifting said shafts axially to vary the pitches of the rotors of one unit in one sense and the pitches of the rotors of the other unit in the opposite sense upon movement of the lever in one plane, and for shifting the cam means of both units in the same directions upon movement in a plane at a right angle to the first mentioned planes, and steering mechanism connected to said shafts for rotating the shafts of said units, simultaneously.

12. In a helicopter, the combination of an elongated body, a counter-rotating, coaxial rotor unit adjacent each end of said body, each unit having an engine, a pair of variable pitch rotors, means for controlling the pitch of individual rotors, and a transmission driven by said engine for rotating said rotors in opposite directions, means connecting said rotor units to enable each engine to drive all of said rotors at a constant speed-relationship regardless of variation in the individual pitch setting of the rotors, and means including control connections interconnecting the pitch control means of both of said rotor units for varying the pitches of the rotors of both units simultaneously in the same sense, to control ascent and descent of the helicopter without relative fore-and-aft pitching movement.

13. In a helicopter, the combination of an elongated body, a counter-rotating, coaxial rotor unit adjacent each end of said body, each unit having an engine, a pair of variable pitch rotors, means for controlling the pitch of individual rotors, and a transmission driven by said engine for rotating said rotors in opposite directions, means connecting said rotor units to enable each engine to drive all of said rotors at a constant speed-relationship, and means including control connections interconnecting the pitch control means of both of said rotor units for varying the pitches of the rotors of said units simultaneously in opposite senses to control fore-and-aft pitching movement of the helicopter.

14. In a helicopter, the combination of an elongated body, a counter-rotating, coaxial rotor unit adjacent each end of said body, each unit having an engine, a pair of variable pitch rotors, means for controlling the pitch of individual rotors, and a transmission driven by said engine for rotating said rotors in opposite directions, means connecting said rotor units to enable each engine to drive all of said rotors at a constant speed-relationship, and means including control connections interconnecting the pitch control means of both of said rotor units for varying the pitches of oppositely rotating rotors in opposite senses to effect the steering of the helicopter.

15. In a helicopter, the combination of an elongated body, counter-rotating variable pitch rotor units at opposite ends of said body, means for controlling the pitch of individual rotors, each unit having an engine and a transmission driven by said engine for rotating said rotors in opposite directions, means connecting said rotor units to enable each engine to drive both of said rotor units at a constant speed-relationship regardless of variation in the individual pitch setting of the rotors, and means including control connections interconnecting the pitch control means of both of said rotor units for varying the pitches of the rotors of both units simultaneously in the same sense and including control connections for varying the pitch of one unit in one sense and the pitch of the other unit in the opposite sense.

16. In a helicopter, the combination of an elongated body, counter-rotating variable pitch rotor units at opposite ends of said body, each rotor having at least one wing, means for cyclically varying the sectional shape of each wing, means for controlling the pitch of individual rotors, means for rotating said rotors in opposite directions, including means interconnecting said rotor units to drive both of said units at a constant speed-relationship, and control means including control connections interconnecting the pitch control means of both of said rotor units for selectively varying the pitches of said rotors to regulate their lift and their torque reactions, and including control connections interconnecting said sectional shape varying means of both of said units.

VINCENT BENDIX.